United States Patent [19]
Wentworth

[11] 3,785,590
[45] Jan. 15, 1974

[54] SPACECRAFT BODY WITH ROLLER MECHANISM FOR DEPLOYABLE-RETRACTABLE THIN FILM SOLAR ARRAY

[75] Inventor: Donald L. Wentworth, Braddock Heights, Md.

[73] Assignee: Communications Satellite Corporation, Washington, D.C.

[22] Filed: Dec. 21, 1970

[21] Appl. No.: 100,016

[52] U.S. Cl. .................... 244/155, 136/89, 160/245
[51] Int. Cl. ............................................ H01l 15/02
[58] Field of Search .................... 244/155; 136/89; 160/243, 245, 120, 242

[56] References Cited
UNITED STATES PATENTS

| | | | |
|---|---|---|---|
| 3,459,391 | 8/1969 | Haynos | 136/89 X |
| 530,079 | 12/1894 | Bergstresser et al. | 160/245 X |
| 1,435,426 | 11/1922 | Spencer | 160/245 |

*Primary Examiner*—Allen B. Curtis
*Attorney*—Sughrue, Rothwell, Mion, Zinn & Macpeak

[57] ABSTRACT

Rotatable, roller booms are carried by an extendable member which moves outward from a spacecraft body with one end of each flexible solar cell panel rigidly coupled to the spacecraft body and the other end rigidly coupled to the periphery of a rotatable roller boom. During deployment, the solar cell panels which are rolled up on the roller booms unwind. A spring-operated negator motor coupled to the rotating boom at one end and to the fixed housing at the end of the deployment member, winds up during deployment of the solar cell panel to facilitate retracting of the thin film solar array by rewinding the flexible solar panels about the periphery of the roller booms.

7 Claims, 5 Drawing Figures

PATENTED JAN 15 1974 3,785,590
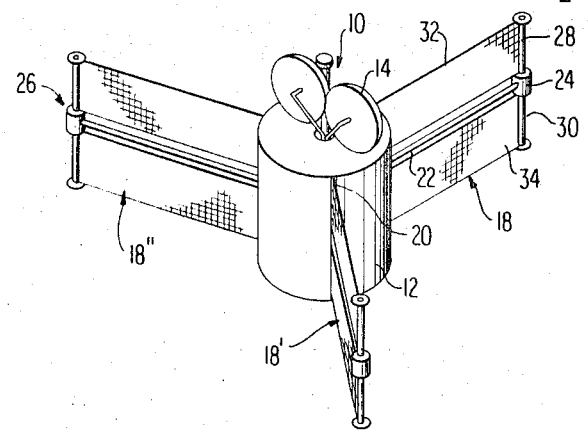
FIG. 1
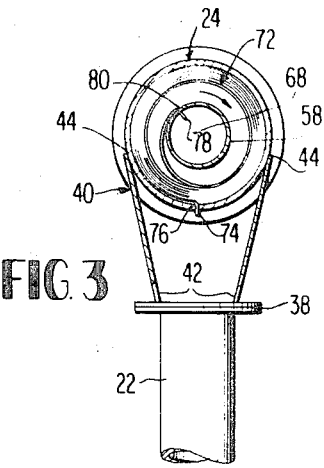
FIG. 3
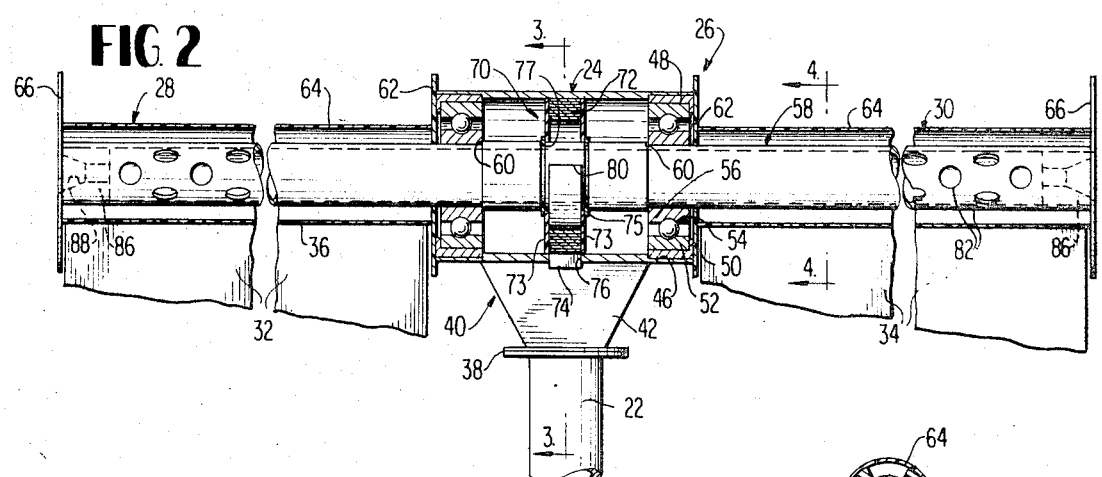
FIG. 2
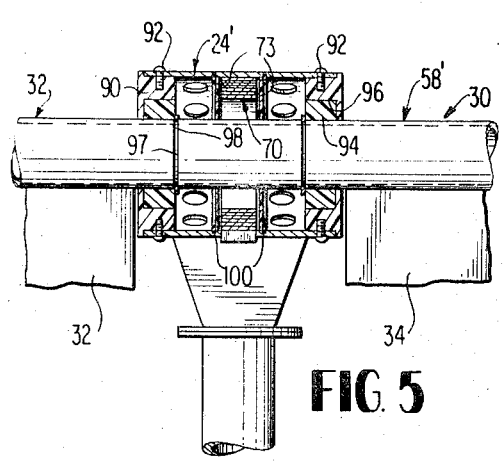
FIG. 5
FIG. 4
INVENTOR
DONALD L. WENTWORTH
BY Sughrue, Rothwell, Mion,
Zinn & Macpeak
ATTORNEYS

SPACECRAFT BODY WITH ROLLER MECHANISM FOR DEPLOYABLE-RETRACTABLE THIN FILM SOLAR ARRAY

BACKGROUND OF THE INVENTION

Field of the Invention

The present invention relates to spacecraft, and more particularly to spacecraft useful in communications systems in which large power requirements are furnished by self-carried solar energy conversion means.

Spacecraft, employed in communications systems, require extensive power plants for powering the various control sub-systems such as those used for attitude control as well as supplying the needs to the overall communication system components. Solar cells both in terms of fixed arrays, and deployable arrays have been used for converting the solar energy directly into electrical form. The employment of flexible solar cell panels allows the solar cell array to be carried internally of; that is, within or adjacent to, the spacecraft body during vehicle launch with the flexible panels being deployed outwards of the spacecraft subsequent to achievement of orbit and attitude or orientation of the spacecraft when employed in a satellite communication system. One of the more useful roll-out concepts for a deployable flexible solar cell panel array involves the storage of the flexible panel on a drum fixed to the spacecraft with the electrical power being transferred through the rolling mechanism by way of slip rings or the like. Roll-out devices of this type are complicated by the necessity of the slip rings to transfer power from the array and the transfer of power across rotating surfaces inherently results in some inefficiency and loss of power. These prior art deployment systems are incapable of compensating for thermally induced changes in length of the solar arrays which result in sapcecraft instability or poor efficiency. Fixed tension devices are not capable of accepting the thermally induced length changes in the boom and/or blanket thus maintaining blanket tension. Blanket tension; if too low, can effect the angle of solar flux degrading power; if too high, it can damage the materials.

SUMMARY OF THE INVENTION

The present invention is directed to an inexpensive, lightweight, compact, deployable, flexible solar cell panel array employable with a spacecraft or the like. The deployable array may be retractable and may include a plurality of flexible solar cell panels with their inner ends rigidly coupled to the side wall of the spacecraft. Roller booms are coupled to the opposite ends of each panel. An e.tensible member movable outwards of the spacecraft body and having a housing at its movable end has the roller booms rotatably coupled thereto for rotation about the boom axis. A spring-operated negator motor has one end fixed to the cylindrical housing and the other end to the periphery of the roller boom such that, during deployment of the solar cell panels, which are wrapped about the periphery of the roller booms, the negator spring is wound up. Retraction of the roller booms from a deployed position towards the spacecraft body is achieved by the stored energy of the wound spring motor. Further, the wound motor provides constant tension on the solar array whose inner end is maintained firmly attached to the spacecraft and thereby provides the retractable force. Detent pins carried by the spacecraft body internally of the side wall slot through which the flexible panel array passes, enter appropriate, self-locating holes in the ends of the roller boom to maintain the rolled-up solar cell panel in proper position during spacecraft launch or further maneuvering of the spacecraft after orbiting is achieved.

BRIEF DESCRIPTION OF THE DRAWINGS

FIG. 1 is a perspective view of a communications spacecraft of the present invention with the flexible solar cell panel array in deployed position.

FIG. 2 is a partial, sectional view of a portion of the array illustrated in FIG. 1 showing the roller boom assembly and the negator motor for retracting the same.

FIG. 3 is a sectional view of the assembly of FIG. 2 taken about lines 33.

FIG. 4 is a sectional view of the assembly of FIG. 2 taken of the right-hand roller boom illustrated in FIG. 2 taken about lines 44.

FIG. 5 is a partial sectional view of a roller boom assembly in the form of a second embodiment of the present invention.

DESCRIPTION OF THE PREFERRED EMBODIMENT

The deployable solar array of the present invention which is retractable as desired, is employed in FIG. 1 with a spacecraft 10 having a cylindrical body 12 with communication system components 14 positioned about the longitudinal axis of the spacecraft. The solar cell array comprises three identical flexible solar cell panel assemblies 18, 18' and 18'' which are extendable, that is deployable, from within the spacecraft through narrow longitudinal slots 20 extending the length of the cylindrical body 12 and generally parallel to the axis of the spacecraft. Each assembly comprises a radially extensible member 22 in the form of an extensible hollow shaft which may constitute for instance a series of telescoping light weight metal tubes and carrys at the outer end, a cylindrical metal housing 24 which in turn rotatably supports a roller boom assembly 26. Assembly 26 constitutes paired roller booms 28 and 30 extending outwardly from cylindrical metal housing 24 on each side thereof for rotation about an axis passing through the cylindrical metal housing, and at right angles to member 22. Each solar cell assembly further comprises left and right hand solar array panels 32 and 34. The outer edge of panels 32 and 34 are coupled directly to the periphery of respective roller booms 28 and 30 by suitably coupling means such as an adhesive or the like. The inner edge of the rectangular flexible solar cell panels 32 and 34, are rigidly and electrically coupled to the spacecraft power system internally of the cylindrical side wall 12 (by means not shown). It should be noted, however, that in practical application of the present invention these solar cell panels may be affixed at other angles to the spacecraft body and may be deployed in directions which are not radial from the longitudinal axis of the sapcecraft.

The flexible solar cell panels may for instance employ a flexible plastic film substrate which carries thin film solar cells consisting of P/N type junctions deposited thereon by vapor deposition or similar techniques. The thin film solar cells may be formed of polycrystalline cadmium sulfide which achieves significant weight and costs advantages with resultant power-to-weight ratio improvement over prior art solar cells materials. The thin film cadmium sulfide solar cells themselves form no part of the present invention and are of the type disclosed in U. S. Pat. application No. 681,127 filed Nov. 2, 1967, now U.S. Pat. No. 3,544,041, to Wilfred J. Billerbeck and assigned to the common assignee.

A principal aspect of the present invention resides in the retractable deployment system which makes use of the extensible support member 22 for supporting the paired roller booms 28 and 30 for rotation about their axis. This facilitates the wrapping of the thin film solar cell panels 32 and 34 about the periphery of the respective booms during retraction of the panel assemblies and unwrapping of the same during deployment. The extensible shaft 22 is projected radially of the cylindrical body 12 and through the slots 20 receiving the same. In this respect, the metal housing 24 is coupled to member 22 by a double flange connection 38; one flange being carried by member 22 and the other by the roller stem adapter 40. By referring to FIG. 3, it is noted that the stem adapter 40 constitutes two plates 42 which extend outwardly and are joined at one end to the upper flange of the flange assembly 38 and at the opposite end to the periphery of the metal housing 24 as at 44. In the embodiment of FIG. 2, the cylindrical metal housing 24 is bored and threaded at 46 at each end and receives threaded cylindrical metal bushings 48 which includes a radial flange 50 at its outer end. Flange 50 abuts the outer race 52 of each lightweight metal ballbearing 54. The inner race 56 of each ballbearing, receives a tube or shaft 58 which extends completely through the metal housing 24. The tube 58 is provided with paired shoulders 60 against which the inner ballbearing races 56 abut to locate the tube 58 with respect to housing 24. In turn, Teflon end caps 62 fixed to outer, concentric sleeves 64 act in conjunction with outer Teflon end caps 66 to complete the roller boom assembly 26. The outer marginal edge of each solar cell panel 32 and 34 is attached at 36 to the periphery of outer tube 64 of the right and left hand roller booms 28 and 30. The roller booms are thus free to rotate at right angles to the projecting support member 22 with member 22 and the metal housing 24 held stationary.

Positive means such as a suitable electric motor (not shown) internally of the cylindrical body 12 is mechanically coupled to the member 22 for extending the same and deploying the roller boom assembly 26. During deployment and extension of tubular member 22, boom assembly 26 rotates about axis 68, FIG. 3, in a clockwise direction as shown by the arrow and due to the restraint of the inner edge of the panels 32 and 34, the panels merely unwind from the periphery of outer tubes 64 forming components of each of the left and right hand boom rollers 28 and 30.

Means are provided for making the roll-out device retractable through the use of a coil spring negator motor indicated generally at 70. The motor constitutes a coil spring having one end 74 extending through a slot 76 within the cylindrical metal housing 24 while the opposite ends 78 projects through a slot 80 within shaft 58 of the rotatable boom assembly 26.

In order to maintain the negator spring 72 in proper position, Teflon bailers 73 which are annular in configuration and have diameters correspondent to shaft 58 and the interior of the metal housing 24, are maintained in proper position through the employment of snap rings 75 which snap into appropriate peripherial grooves 77 within the outer periphery of shaft 58. The outer peripherial edges of the Teflon bailers are coupled directly to the interior of the cylindrical metal housing 24.

The operation of the coil spring negator motor 70 is much the same as a window shade in that, during positive deployment of the panel, the negator spring is wound up by the clockwise rotation of left and right hand roller booms 28 and 30 as defined by outer tube 64 while the panels are being unwound from the periphery of the same. Preferably, the inner tube or shaft 58 is perforated at 82 to reduce weight. Once extended, the boom may be locked in its outermost position by means (not shown) associated with the extensible member 22. Since the negator motor winds and stores energy about the roller shaft 58 as the boom deploys the roll, the tension acting on the coil spring is transferred to the solar array whose inner edge is firmly attached to the spacecraft and thereby provides a retractable force once the restraint acting on the extendable member is released. As the boom is commanded to retract, the stored energy of the coil spring motor rotates the roller shaft 58, rolling the flexible panels about the periphery of the roller booms 28 and 30. All three assemblies 18, 18' and 18" move in unison both into retracted or deployed position. Foam spacers 84 provide for a certain amount of rigidity between the outer boom tube 64 and the inner roller shaft 58. The spacers are necessary to build up the diameter such that the deployment ratio is 1 : 1 with the negator coil. In a more sophisticated embodiment, the spring motor may be replaced by a reversible electric motor. The system allows ready deployment of the solar array for use, and retracts the same upon command during changes in position of the spacecraft and during launch of the spacecraft. In this respect, each tubular shaft 54 is provided with end plugs 86 internally of the Teflon end caps 66 and each plug 86 carrys a tapered hole 88. Retractable pins (not shown) mounted within the spacecraft seek the self-locating holes 88 during movement of the boom assembly 26 into the cylindrical body 12 of the spacecraft and into longitudinal alignment with the pins. Thus, during retraction, the motor's constant force on the array maintains a tight compact roll of the flexible panels onto respective roller booms and when, each assembly 18, 18' and 18" move into the spacecraft container, the retention devices incorporating retractable pins are driven into the self-locating holes in the array end plugs 86 to hold the same prior to a subsequent deployment command. Initially, the retention devices are required for stability during launch. Foam padding within the container provides a snug but protective pre-load condition for launch or after initial deployment and retraction, during maneuvering of the spacecraft.

The present concept is not limited to size nor spacific structure. With the advent of thin film solar cells, a large array using dual booms and dual negators, or spring-loaded shafts at low weight to size ratios have ready application.

Turning to FIG. 5, an alternate embodiment of the invention is illustrated. Like components to the embodiment of FIGS. 2, 3 and 4 are provided with like numerical designations. In this case, the individual panels 32 and 34 are coupled directly to the periphery of the hollow roller shaft 58'.

The metal housing 24', in this case, is coupled to annular, polished aluminum retaining rings 90 by means of appropriate set screws 92. In this case, instead of employing ballbearings, annular Rulon bearings 94 are received within circular recesses 96 within the polished aluminum bearing retainers 90, with the internal diameter of the cylindrical bearings 94 being on the order of the metal roller shaft 58'. Peripheral slots 97 are formed within the roller 58' and receive snap rings 98 to properly locate the fixed housing 24 with respect to the internal roller 58'. The Teflon bailers 73 are maintained in proper position in this case by paired snap rings 100 which are received within appropriate circumferential slots within the interior of the metal housing 24'. The negator spring motor 70 is in this case identical in all respects to that illustrated in the embodiment of FIG. 2. Further, the operation of the deployment and retraction of each of the roller booms is also identical.

Since it is desirable to maintain the assembly as lightweight as possible, the metal members may be formed of either aluminum or aluminum magnesium alloy having high strength and low weight. Other new metal and plastic materials suitable for space environment applications may be employed within the ordinary skill of the designer. In the embodiment of FIG. 5, replacement of the metal ballbearings by unitary Rulon sleeve bearings has the further effect of reducing the weight of the assembly along with the elimination of the outer roller tube 64 in this embodiment.

While the invention has been particularly shown and described with reference to the preferred embodiments thereof, it will be understood by those skilled in the art that various changes in the form and details may be made therein without departing from the spirit and scope of the invention.

What is claimed is:

1. In combination, a spacecraft including a spacecraft body, extensible and retractable support means carried by said spacecraft and movable outwardly of said spacecraft body, roller boom means rotatably coupled to the outer end of said support means, flexible panel means comprising at least one flexible solar cell panel having its inner edge fixed to said body for both mechanical and electrical connection thereto and its outer edge fixed to the periphery of said roller boom means, and motor means carried at the outer end of said extensible support means and operatively coupled to said roller boom means for applying tension to said panel during extension of said support means and maintaining tension on said panel while said support means is extended and for exerting a force on said roller boom means to cause rotation of said roller boom means and wrapping of said panel means about said roller boom means during retraction of said support means.

2. In combination, a spacecraft including a spacecraft body, extensible and retractable support means carried by said spacecraft and movable outwardly of said spacecraft body, a roller boom means rotatably coupled to the outer end of said support means, flexible panel means comprising dual flexible solar panels having their inner edges respectively fixed to said body and their outer edges respectively fixed to the periphery of said roller boom means with said extensible support means comprising a light weight metal tube, and wherein a housing is fixed to the outer end of said tube and includes annular bearings internally thereof, a rotatable shaft is mounted within said housing on said annular bearings and has ends extending outwardly from both sides of said panels, and means coupling the outer edge of each solar cell panel to said rotatable shaft on respective sides of said housing, said spacecraft further comprising means for applying tension to said flexible panel during deployment and maintaining said tension when deployed.

3. The spacecraft as claimed in claim 1, wherein; said flexible panel means comprise dual flexible solar cell panels, said extensible and retractable support means comprises a light weight metal tube, a housing is fixed to the outer end of said tube and includes annular bearings internally thereof, a rotatable shaft is mounted within said housing on said annular bearings and has ends extending outwardly from both sides of said housing, and wherein means couple the outer edge of each solar cell panel to said rotatable shaft on respective sides of said housing.

4. The spacecraft as claimed in claim 2, wherein said means for applying tension to said flexible panel means includes negator motor means comprising a steel negator spring coiled about said rotatable shaft with one end of said spring fixed to said housing and the other end of said spring fixed to said rotatable shaft whereby; extension of said support means results in unwrapping of said flexible solar cell panels from the periphery of said shaft and winding up of said steel negator spring.

5. The spacecraft as claimed in claim 4, wherein: said housing includes threaded, metal bushings at respective ends, said rotatable shaft includes a pair of shoulders formed on the outer periphery and axially inwards of said threaded metal housing bushings, and said spacecraft further includes lightweight metal ballbearings sandwiched between said shoulders and said bushings for rotatably mounting said shaft within said relative fixed housing.

6. The spacecraft as claimed in claim 4 further comprising paired, Teflon bailers positioned on either side of said steel negator spring, and snap rings carried by peripheral slots within said rotatable shaft for locating said spring axially with respect to said rotatable shaft.

7. The spacecraft as claimed in claim 1, wherein; said flexible panel means comprises a pair of solar cell panels and wherein said roller boom means comprises: a rotatable shaft extending through a housing fixed to the outboard end of said support means, Teflon end caps mounted on said rotatable shaft adjacent to the ends of the housing and at the ends of said rotatable shaft, a sleeve member extending between respective end caps on each side of said housing to define individual roller booms for each solar cell panel and means for fixing the outer edge of said solar cell panels to the periphery of respective sleeve members.

* * * * *

UNITED STATES PATENT OFFICE
CERTIFICATE OF CORRECTION

Patent No. 3,785,590            Dated January 15, 1974

Inventor(s) Donald L. WENTWORTH

It is certified that error appears in the above-identified patent and that said Letters Patent are hereby corrected as shown below:

Column 6, line 9 - after "said" delete "panels" and insert -- housing --

Signed and sealed this 7th day of May 1974.

(SEAL)
Attest:

EDWARD M. FLETCHER, JR.          C. MARSHALL DANN
Attesting Officer                 Commissioner of Patents